United States Patent
Soldan et al.

(10) Patent No.: US 8,786,547 B2
(45) Date of Patent: Jul. 22, 2014

(54) EFFECTS OF GRAVITY ON GESTURES

(75) Inventors: Eric R. Soldan, Saratoga, CA (US);
Kenneth G. Oetzel, Belmont, CA (US)

(73) Assignee: Microsoft Corporation, Redmond, WA (US)

(*) Notice: Subject to any disclaimer, the term of this patent is extended or adjusted under 35 U.S.C. 154(b) by 469 days.

(21) Appl. No.: 12/978,199

(22) Filed: Dec. 23, 2010

(65) Prior Publication Data
US 2012/0165074 A1   Jun. 28, 2012

(51) Int. Cl.
*G06F 3/033* (2013.01)

(52) U.S. Cl.
USPC .......... 345/158; 345/157; 345/164; 345/169; 345/173

(58) Field of Classification Search
None
See application file for complete search history.

(56) References Cited

U.S. PATENT DOCUMENTS

| | | | |
|---|---|---|---|
| 7,647,195 B1* | 1/2010 | Kahn et al. | 702/141 |
| 7,970,586 B1* | 6/2011 | Kahn et al. | 702/189 |
| 2004/0140962 A1 | 7/2004 | Wang et al. | |
| 2005/0212767 A1* | 9/2005 | Marvit et al. | 345/158 |
| 2006/0017692 A1* | 1/2006 | Wehrenberg et al. | 345/156 |
| 2006/0177112 A1* | 8/2006 | Yang et al. | 382/120 |
| 2006/0187204 A1* | 8/2006 | Yi et al. | 345/158 |
| 2007/0113207 A1 | 5/2007 | Gritton et al. | |
| 2007/0171202 A1* | 7/2007 | Yang et al. | 345/158 |
| 2008/0034321 A1* | 2/2008 | Griffin | 715/799 |
| 2008/0192005 A1* | 8/2008 | Elgoyhen et al. | 345/158 |
| 2009/0088204 A1* | 4/2009 | Culbert et al. | 455/556.1 |
| 2009/0179857 A1* | 7/2009 | Hsu et al. | 345/157 |
| 2009/0183193 A1 | 7/2009 | Miller et al. | |
| 2009/0265671 A1* | 10/2009 | Sachs et al. | 715/863 |
| 2009/0303204 A1* | 12/2009 | Nasiri et al. | 345/184 |
| 2010/0174506 A1* | 7/2010 | Joseph et al. | 702/141 |
| 2010/0191501 A1* | 7/2010 | Kitamura et al. | 702/150 |
| 2010/0192662 A1* | 8/2010 | Yanni | 73/1.38 |
| 2010/0214211 A1* | 8/2010 | Dods et al. | 345/156 |
| 2011/0025625 A1* | 2/2011 | Hirako | 345/173 |
| 2011/0037779 A1* | 2/2011 | Liang | 345/661 |
| 2011/0048103 A1* | 3/2011 | Su et al. | 73/1.79 |
| 2011/0163655 A1* | 7/2011 | Stange | 313/311 |
| 2011/0187660 A1* | 8/2011 | Hirata et al. | 345/173 |
| 2011/0210926 A1* | 9/2011 | Pasquero et al. | 345/173 |
| 2011/0216093 A1* | 9/2011 | Griffin | 345/659 |
| 2012/0017147 A1* | 1/2012 | Mark | 715/702 |

FOREIGN PATENT DOCUMENTS

| | | |
|---|---|---|
| CN | 1930542 | 3/2007 |
| CN | 101866533 | 10/2010 |

OTHER PUBLICATIONS

Crossan et al., "Variability in Wrist-Tilt Accelerometer Based Gesture Interfaces", Retrieved at << http://citeseerx.ist.psu.edu/viewdoc/download?doi=10.1.1.66.9131&rep=rep1&type=pdf >>, 2004, pp. 12.

(Continued)

*Primary Examiner* — Dai A Phuong
(74) *Attorney, Agent, or Firm* — Micah Goldsmith; Glen Johnson; Micky Minhas

(57) ABSTRACT

Techniques involving an effect of gravity on gestures are described. In one or more implementations, the techniques describe gestures that are usable to provide inputs and therefore initiate operations of a computing device, such as a mobile communications device having telephone functionality. The techniques described herein may be employed to reduce an effect of gravity on an input that describes the gesture. A variety of different gestures are contemplated, such as gestures that are recognized as involving acceleration, e.g., acceleration.

20 Claims, 6 Drawing Sheets

(56) References Cited

OTHER PUBLICATIONS

Smith, Peter, "Using sensor channels on the Samsung i8910 HD", Retrieved at << http://innovator.samsungmobile.com/onlinedocs/cmsCnts/20091210/1013/1013s.html >>, Sep. 2009, pp. 1-14.

Liu et al., "uWave: Accelerometer-based Personalized Gesture Recognition and Its Applications", Retrieved at << http://www.ruf.rice.edu/~mobile/publications/liu09percom.pdf >>, 2009, pp. 9.

Rahmati et al., "NoShake: Content Stabilization for Shaking Screens of Mobile Devices", Retrieved at << http://ahmad.rahmati.com/papers/09.PerCom.NoShake.pdf >>, 2009, pp. 6.

Joselli et al., "gRmobile: A Framework for Touch and Accelerometer Gesture Recognition for Mobile Games", Retrieved at << http://www.ic.uff.br/~esteban/files/papers/SBGames09_Mark_A.pdf>>, 2009, pp. 7.

Yang et al., "A Novel Hand Gesture Input Device Based on Inertial Sensing Technique", Retrieved at << http://ieeexplore.ieee.org/stamp/stamp.jsp?tp=&arnumber=1432249 >>, Nov. 2-6, 2004, pp. 6.

"Foreign Office Action", CN Application No. 201110436101.X, Mar. 5, 2014, 11 Pages.

* cited by examiner

EFFECTS OF GRAVITY ON GESTURES

BACKGROUND

The amount of functionality that is available from computing devices is ever increasing, such as from mobile communication devices, game consoles, televisions, set-top boxes, personal computers, and so on. However, traditional techniques that were employed to interact with the computing devices may become less efficient as the amount of functionality increases.

For example, inclusion of additional functions in a menu may add additional levels to the menu as well as additional choices at each of the levels. Consequently, the addition of these functions in the menu may frustrate users by the sheer number of choices of functions and thereby result in decreased utilization of both the additional functions as well as the device itself that employs the functions. Thus, traditional techniques that were used to access the functions may limit the usefulness of the functions to a user of the computing device.

SUMMARY

Techniques involving an effect of gravity on gestures are described. In one or more implementations, the techniques describe gestures that are usable to provide inputs and therefore initiate operations of a computing device, such as on a mobile communications device having telephone functionality. The techniques described herein may be employed to reduce an effect of gravity on an input that describes the gesture. A variety of different gestures are contemplated, such as gestures that are recognized as involving acceleration, e.g., acceleration.

In one or more implementations, an input received by a computing device is recognized as involving acceleration. An effect of gravity is reduced from the input by the computing device and a gesture is identified from the input that has the effect of gravity reduced from the recognized input, the gesture effective to cause an operation to be performed by the computing device.

In one or more implementations, an input is recognized as involving acceleration of a mobile communication device beyond a threshold for one or more of an x, y, or z axis. A gesture is identified from the input that has an effect of gravity reduced from one or more of the x, y, or z axis, the gesture effective to cause an operation to be performed by the mobile communication device.

In one or more implementations, a mobile communication device comprises a housing, a display device disposed on the housing and configured to be viewable by a user, one or more accelerometers disposed within the housing and configured to detect acceleration through an x, y, and z axis; and one or more modules disposed within the housing and communicatively coupled to the accelerometers and the display device. The one or more modules are configured to recognize an input detected using the one or more accelerometers as describing acceleration of the mobile communication device through the x, y, or z axis, reduce an effect of gravity from the input using interpolation and a corresponding threshold for each of the x, y, or z axis, and identify a gesture from the input having the effect of gravity reduced.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Conventional techniques that were used to access functions of a computing device may become less efficient when expanded to access an ever increasing number of functions, such as to navigate through a menu. Therefore, these conventional techniques may result in user frustration regarding the additional functions and may result in decreased user satisfaction with a computing device having those additional functions.

One technique that was developed to increase the ways in which a user may interact with a computing device involves gestures to initiate functions of the computing device. In this way, a user may readily access the functions in an efficient and intuitive manner without encountering the complexities involved using conventional access techniques, e.g., a mouse and hierarchical menu. In one or more examples, a gesture may involve acceleration (e.g., a mobile communications device such as a wireless phone, a game controller, and so forth) to initiate operations, such as pan, zoom, clear, next page, previous page, and so forth. However, conventional techniques that were employed to detect gestures involving acceleration may be limited by an inability to determine orientation or direction of the device being moved due to the effects of gravity on inputs provided to describe the gestures.

Accordingly, techniques are described herein that may be employed to reduce an effect of gravity on an input that is usable to describe a gesture. In this way, a wider variety of gestures may be defined and implemented that involve acceleration. For example, a wireless phone may include one or more accelerometers to detect acceleration in x, y, and z axes. The techniques described herein may then be utilized to reduce the effect of gravity from the inputs that describe the acceleration. Consequently, the techniques may be leveraged to support a wide variety of gestures than may involve detecting an orientation, direction, rotation, and so on, further discussion of which may be found in relation to the following sections.

In the following discussion, an example environment is first described that is operable to employ the gesture techniques described herein. Example illustrations of gestures and procedures involving the gestures are then described, which may be employed in the example environment as well as in other environments. Accordingly, the example environment is not limited to performing the example gestures and procedures. Likewise, the example procedures and gestures are not limited to implementation in the example environment.

Example Environment

Figure 1:
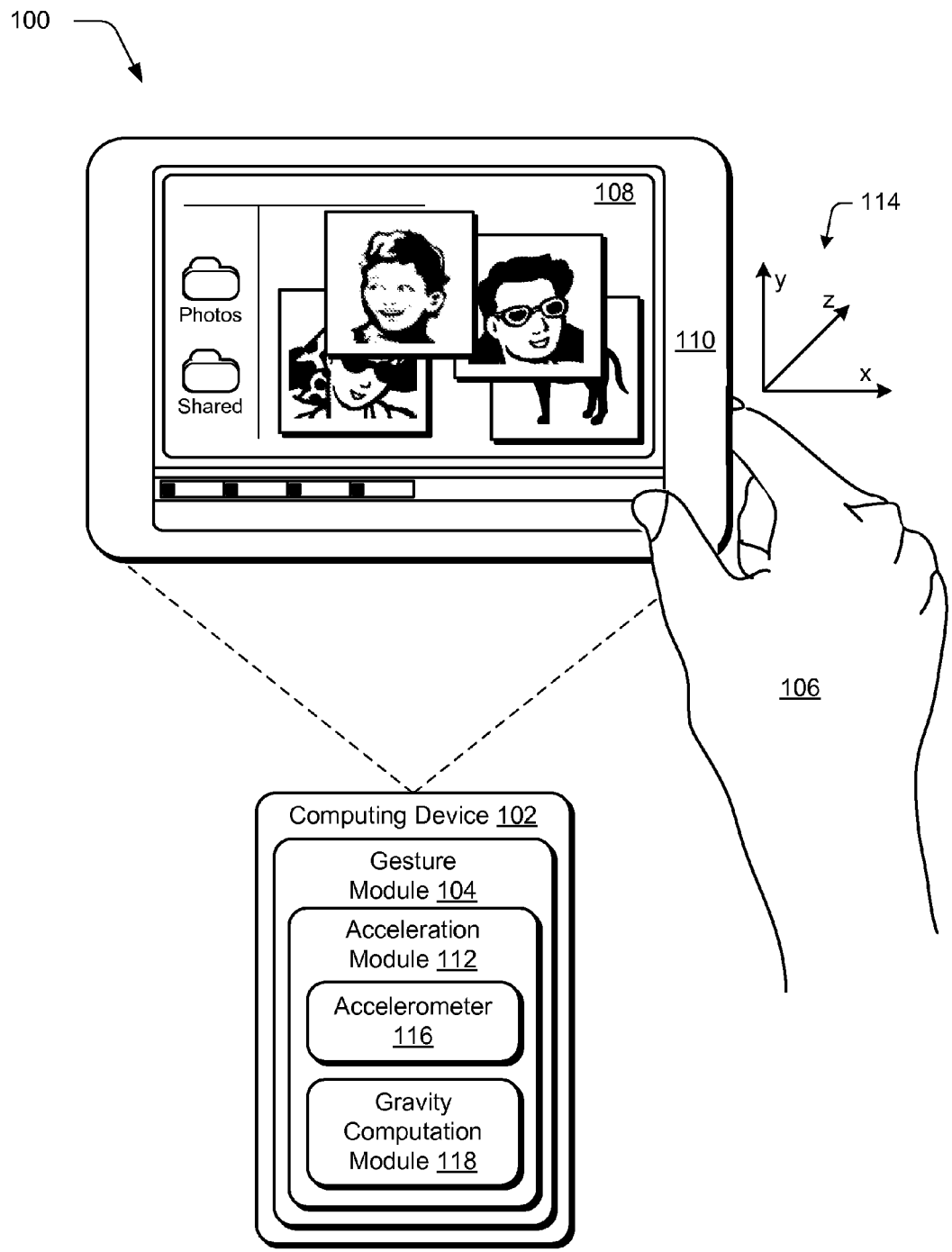
FIG. 1 is an illustration of an environment in an example implementation that is operable to employ techniques involving effects of gravity on gestures that involve detecting acceleration.

FIG. 1 is an illustration of an environment 100 in an example implementation that is operable to employ techniques involving an effect of gravity on gestures. The illustrated environment 100 includes an example of a computing device 102 that may be configured in a variety of ways. For example, the computing device 102 may be configured as a traditional computer (e.g., a desktop personal computer, laptop computer, and so on), a game console, and so forth. The computing device 102 may also be configured as a mobile communication device (e.g., a wireless phone, tablet computer, personal digital assistant, and so on) as illustrated. Thus, the computing device 102 may range from full resource devices with substantial memory and processor resources (e.g., personal computers, game consoles) to a low-resource device with limited memory and/or processing resources (e.g., traditional set-top boxes, hand-held game consoles).

The computing device 102 is illustrated as including a gesture module 104. The gesture module 104 is representative of functionality to identify gestures and cause operations to be performed that correspond to the gestures. The gestures may be identified by the gesture module 104 in a variety of different ways. For example, the gesture module 104 may be configured to recognize a touch input, such as a finger of a user's hand 106 as proximal to a display device 108 disposed on a housing 110 of the computing device 102 using touchscreen or other functionality, e.g., a camera.

The gesture module 104 may also be configured to recognize inputs that describe acceleration. As illustrated, the gesture module 104 includes a acceleration module 112 that is representative of functionality involving gestures and acceleration. The acceleration module 112, for instance, may be configured to detect acceleration through an x, y, and/or z axis 114. This acceleration 112 may involve acceleration of the computing device 102 itself (e.g., a mobile communication device configured as a wireless phone), one or more input devices (e.g., game controllers) that are communicatively coupled to the computing device 102, and so on.

A variety of different sensors and other functionality may be employed by the acceleration module 112 to detect acceleration. For example, the acceleration module 112 may employ one or more accelerometers 116 to detect acceleration. The accelerometers 116, for instance, may be arranged to detect acceleration in x, y, and z axes 114. In one or more implementations, the accelerometers 116 are a sole source of inputs for detecting acceleration, although other implementations are also contemplated. Having acceleration data from the accelerometer 116 without accompanying gyroscope data using conventional techniques, however, may make it difficult to determine orientation and/or direction of a device being moved, e.g., the computing device 102, controller, and so forth. For example, a horizontally oriented computing device 102 falling straight down at a constant rate may provide a similar input as a device falling along a curve at an accelerating rate.

In another example, the accelerometers 116 may be used to determine orientation (e.g., tilt) at rest, as the accelerometers 116 may measure gravity along the x, y, and z axes 114. For instance, the acceleration module 112 may infer that the computing device 102 is at rest (e.g., in the sense that it is not accelerating) from a series of readings during which $X^2+Y^2+Z^2$ are equal to 1. This may be inferred by the acceleration module 112 as gravity, and so therefore there is no additional acceleration. Accordingly, the values may therefore indicate the orientation in space, e.g., in comparison to the x, y, and z axes 114.

However, a difficulty arises using conventional techniques when there is acceleration other than what is supplied by gravity. Since gravity may be detected as acceleration using conventional techniques, it may be difficult to determine from an input which portion was supplied by gravity and which portion was supplied by acceleration. For example, a device clearly not at rest (e.g., both falling due to gravity and accelerating due to some other force) may be mistaken as a device at rest in a particular orientation. In another example, when using an accelerometer alone for measuring gestures, rotation around the axis of gravity may not result in a change in readings taken using the accelerometer 116. Consequently, it was difficult to accurately identify particular accelerations using data from the accelerometer 116 alone using conventional techniques.

Techniques described herein may leverage data from the accelerometer 116 alone to track orientation and direction of a device. For example, these techniques may be employed for a given period of time to measure acceleration when held in the user's hand 106. Thus, in this example the techniques may leverage a limited range of motion that is likely to be experienced by the computing device 102 through the x, y, and z axes 114 due to both the length of the human arm and the joints around which it can move. For instance, the gestures 104 that are detected may be defined so as to assist in limiting the complexity in differentiating between the gestures, one to another, and therefore aid in the identification using data obtained from the accelerometer 116.

Figure 2:
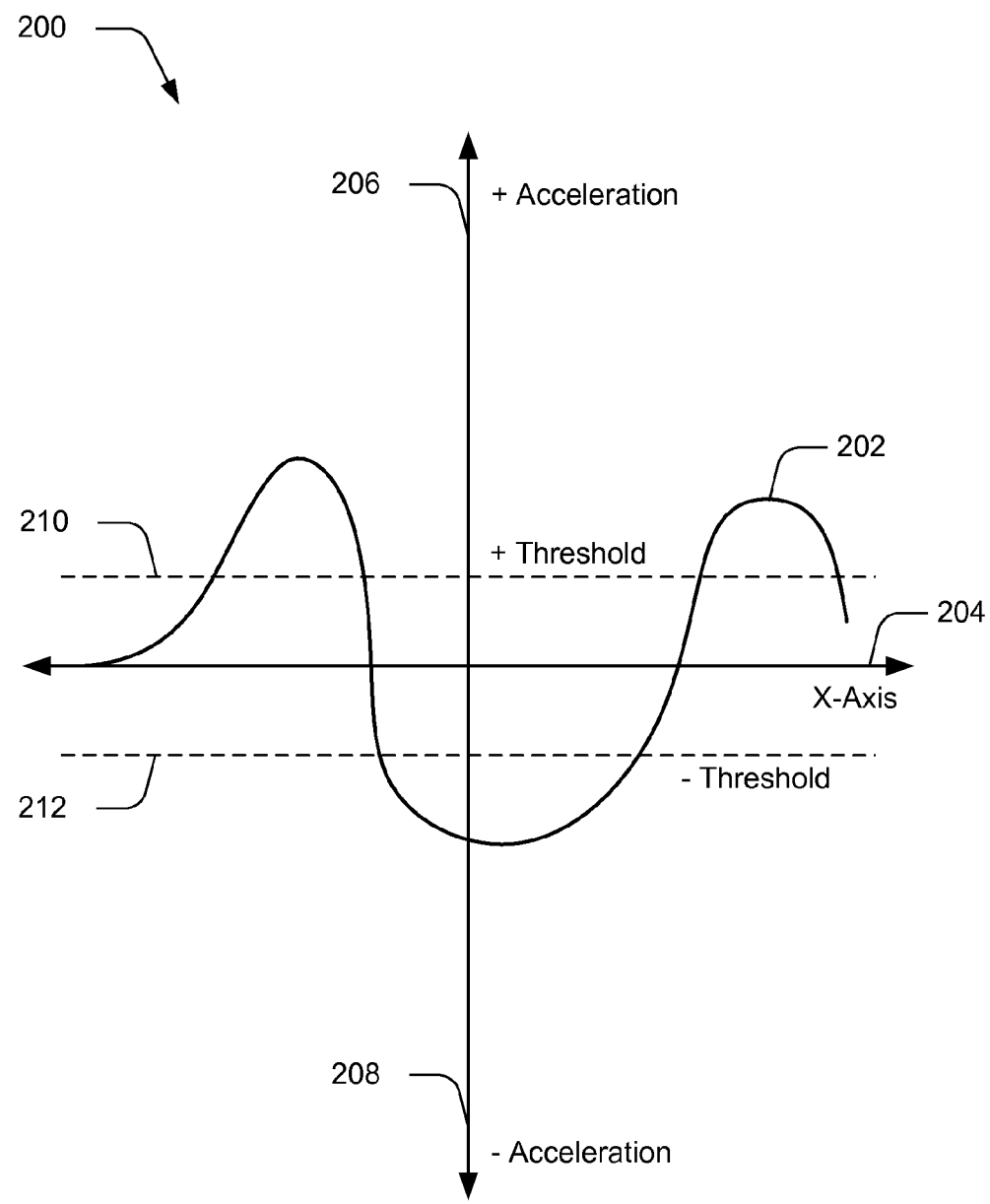
FIG. 2 depicts a graph in an example implementation showing an input as describing acceleration for an x-axis over time.

FIG. 2 depicts a graph 200 in an example implementation showing an input as describing acceleration 202 for an x-axis 204 over time. The graph 200 plots both positive acceleration 210 and negative acceleration 212 for the x-axis 204. As previously described, this graph 200 may be employed to describe "proper acceleration."

It one or more implementations, an assumption is employed by the acceleration module 112 that the force of gravity is generally 1G. However, gravity and its effects may also be measured over time using a running average of SQRT $(X^2+Y^2+Z^2)$ for the x, y, and z axes 114 by the acceleration module 112. In one or more implementations, the acceleration measured by the accelerometer 116 is "proper acceleration" and therefore may be used to measure gravity and thus determine orientation when the computing device 102 is stationary.

As data is received by the acceleration module 112 from the accelerometer 116, samples may be encountered that describe nominal acceleration outside of gravity. These can be used as a basis for gravity elimination in other samples by interpolating and comparing the effect of gravity across the samples. In an implementation, the interpolation performed between the two gravity samples is a quaternion interpolation, which may be used to approximate rotational information for the values between the samples.

Once gravity is reduced from the samples by the acceleration module, near zero acceleration for a particular axis may be represented by a near 0 value for that axis. As illustrated for the graph 200, "plus" and/or "minus thresholds 210, 212 (e.g., threshold values) are used. In one or more implementations, the transitions past the thresholds may be used to define a gesture involving acceleration, further discussion of which may be found in relation to FIG. 5.

An acceleration value beyond the plus or minus thresholds 210, 212 are referred to as an acceleration transition in the following discussion. During an acceleration transition, an integral is accumulated of the area "outside" the threshold by the acceleration module 112. The following values for the integral outside the threshold may be collected by the acceleration module 112:

Area beyond (e.g., over for positive acceleration or under for negative acceleration) the curve;
Time of the start of the curve;
Time of the end of the curve;
Time peak of the curve; and
Amplitude of the curve.

This data may then be compared by the gesture module 104 to a gesture description to identify a particular gesture.

For example, a flick of the user's hand 106 (e.g., and the computing device 102, a controller, and so on) to the right followed by a return to an approximate original location may generate the following for the X axis:

A first integral describing a positive acceleration area, representing the initial acceleration to the right;
A second integral describing a (likely) longer negative acceleration area, as the user stops and then reverses the direction of the flick; and
A third integral describing another positive acceleration area, representing the cessation of the gesture.

The sum of the first and third integrals may approximate that of the second integral as illustrated by the example graph 200 in FIG. 2, although this may depend on an actual value used by the threshold, and whether or not the user returned actually to the original location.

Additionally, the flick of the user's hand 106 to the right followed by a return to an approximate original location may generate the following for the y axis:

Positive integrals because the device is being held in the user's hand 106 in this example, pointing out, and is rotated around the wrist (or elbow) of the user. Accordingly, a reverse in direction is not generally detected. Rather, a centrifugal force of varying degree is described and thus negative integrals are not described in the input for the Y axis in this example.

Further, the flick of the user's hand 106 to the right followed by a return to an approximate original location may generate the following for the z axis:

Nominal values. The closer the device is held to flat, the closer the values reflect "0" for acceleration in this example. Accordingly, the integral may be relatively small, especially if employing a threshold before contributions may be made to an integral.

The integrals computed by the respective x, y, and z axes 114 by the acceleration module 112 may be compared with definitions of gestures by the gesture module 104 to efficiently identify an intended gesture. The gesture may then be initiated by the gesture module 104, such as to cause the computing device 102 to performs one or more operations, further discussion of which may be found in relation to the following procedures.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

The instructions can be stored in one or more computer readable media. As described above, one such configuration of a computer-readable medium is signal bearing medium and thus is configured to transmit the instructions (e.g., as a carrier wave) to the hardware of the computing device, such as via the network 104. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data. The features of the techniques described below are platform-independent, meaning that the techniques may be implemented on a variety of commercial computing platforms having a variety of hardware configurations.

Example Procedures

The following discussion describes techniques involving an effect of gravity on gestures that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the graph 200 of FIG. 2.

Figure 3:
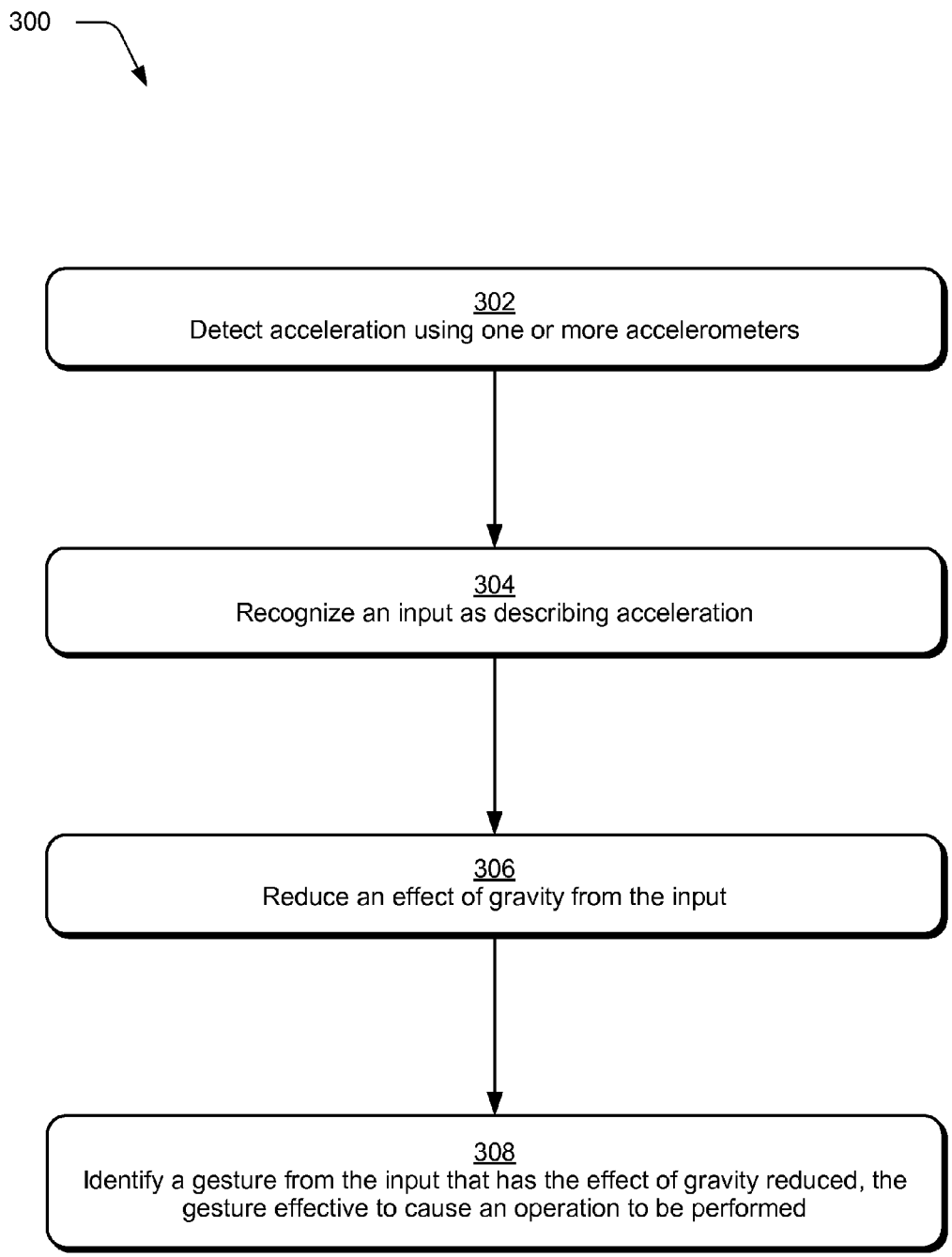
FIG. 3 is a flow diagram depicting a procedure in an example implementation in which an effect of gravity is reduced from an input to identify a gesture that involves acceleration.

FIG. 3 depicts a procedure 300 in an example implementation in which an effect of gravity is reduced from an input to identify a gesture that involves acceleration. Acceleration is detected using one or more accelerometers (block 302). The acceleration, for instance, may be detected by a plurality of single axis accelerometers, through a single multi-axis accelerometer, and so on. Other sensors are also contemplated, such as sensors that are configured to detect motion of the computing device 102, a game controller, and so on.

An input is recognized as describing acceleration (block 304). The gesture module 104, for instance, may receive the input from the accelerometer 116 and thus determine that the input describes acceleration, such as "proper acceleration" that may describe orientation even when at rest.

An effect of gravity is reduced from the input (block 306). In an implementation, the acceleration module 112 may simplify the data into trends that may be used to reduce an amount of data used to describe the acceleration. The acceleration module 112 may also receive inputs and integrate the inputs using quaternion interpolation or other techniques to compare inputs describing different axes and thus reduce and even remove the effect of gravity from the inputs, an example of which is further described in relation to FIG. 4.

A gesture is identified from the input that has the effect of gravity reduced, the gesture effective to cause an operation to be performed (block 308). The gesture module 104, for instance, may compare the input having the effect of gravity reduced to definitions of gestures 104 that are identifiable by the gesture module 104. When a "match" is found (e.g., the input is deemed to be within an acceptable range of a definition for the gesture), the gesture module 104 may thus identify the gesture and initiate an operation to be performed by the computing device 102. A variety of different gestures are contemplated, such as gestures configured to interact with a user interface output on the display device 108 of the computing device 102 (e.g., pan, erase), and so on.

Figure 4:
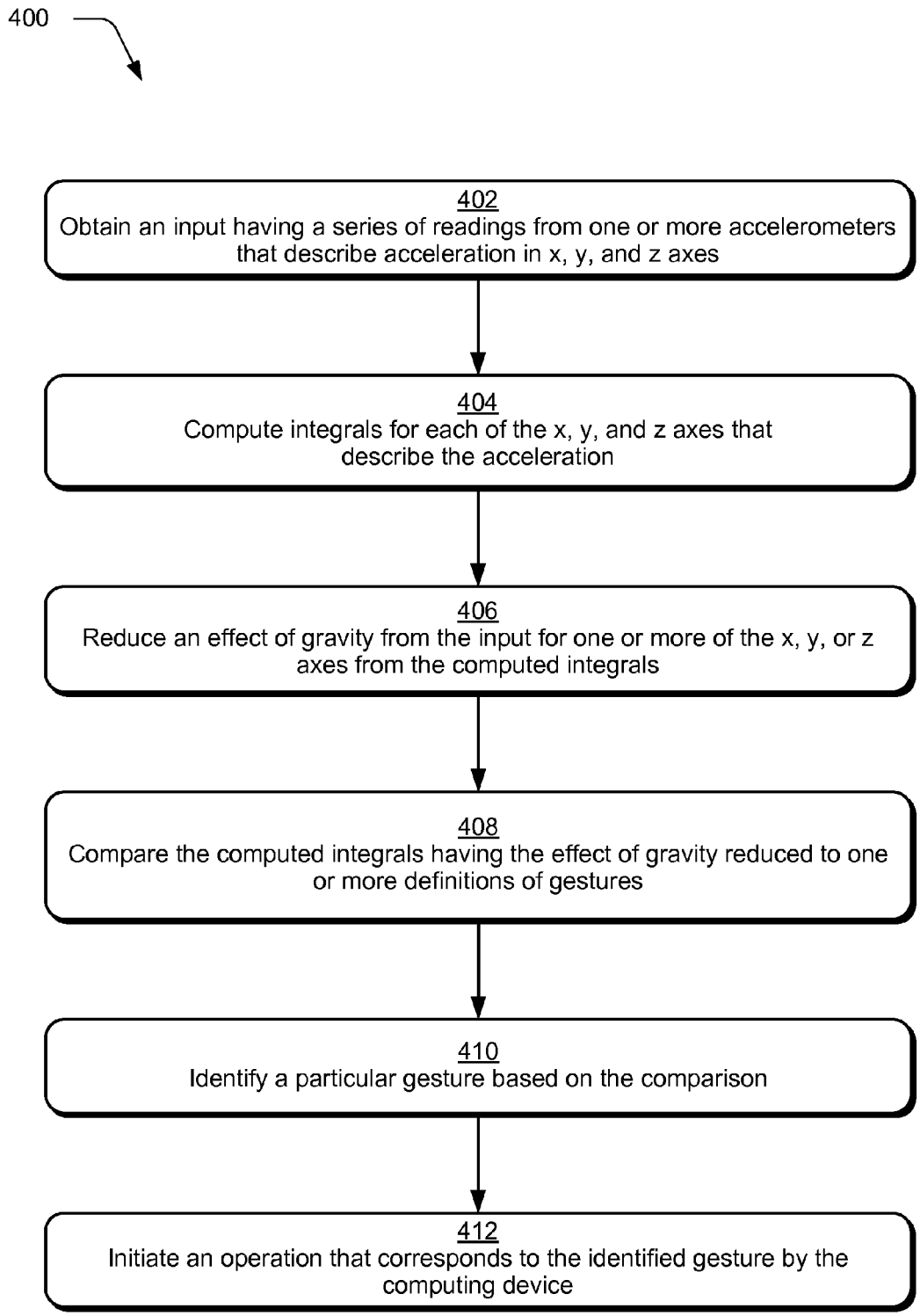
FIG. 4 is a flow diagram depicting a procedure in an example implementation in which an effect of gravity is reduced from an input that describes acceleration in one or more of x, y, or z axes.

FIG. 4 depicts a procedure 400 in an example implementation in which an effect of gravity is reduced from an input that describes acceleration in one or more of x, y, or z axes. An input is obtained as a series of reading from one or more accelerometers that describe acceleration in x, y, and z axes (block 402). As before, the accelerometer may detect acceleration in a plurality of different axes, such as the x, y, and z axes 114 described in relation to FIG. 1.

Integrals are computed for each of the x, y, and z axes that described the acceleration (block 404). As previously described in relation to FIG. 2, integrals may be computed for each of the x, y, and z axes 114 separately. An effect of gravity may then reduced from the input for one or more of the x, y, or z axes from the computed integrals (block 406). The acceleration module 112, for instance, may employ an assumption that the effect of gravity may be represented as $X^2+Y^2+Z^2=1$, and therefore compare inputs from the different axes, one to another, to reduce and even remove the effect of gravity from the input. Other examples are also contemplated, such as to employ a running average of $SQRT(X^2+Y^2+Z^2)$ to computed the effect of gravity on the input and then remove the computed effect from the input, thereby reducing and perchance even eliminating the effect of gravity on the input.

The computed integrals having the effect of gravity reduced are compared to one or more definitions of gestures (block 408). The gesture module 104, for instance, may employ a vocabulary of gestures in which gestures are identifiable using integral range definitions. Therefore, an input may be compared to the definitions. In this way, a particular gesture is identified based on the comparison (block 410) and an operation may be initiated that corresponds to the identified gesture by the computing device (block 412). Although integration was described to remove the effect of gravity from the input, the thresholds themselves may also serve as a basis to define gestures.

Figure 5:
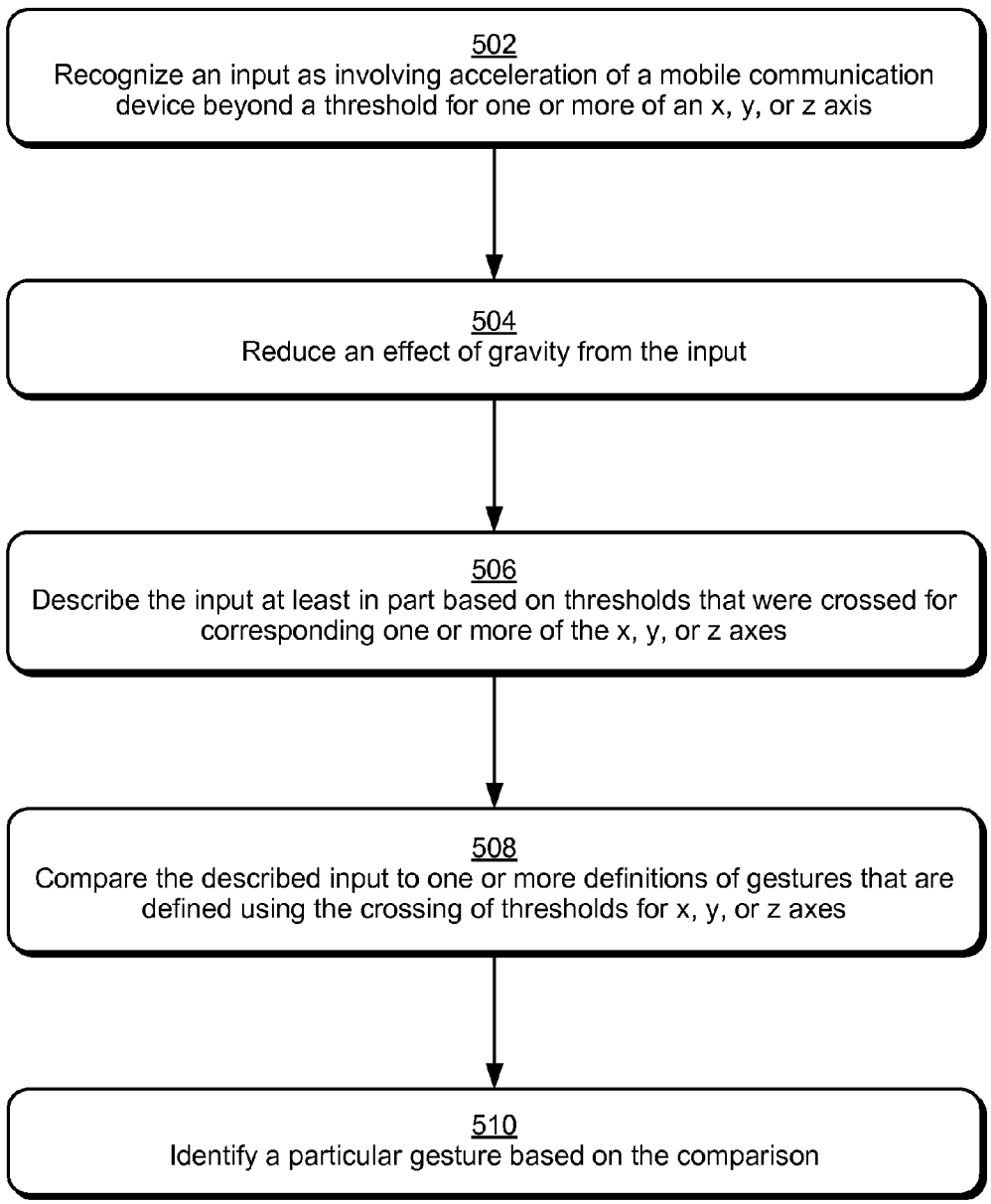
FIG. 5 is a flow diagram depicting a procedure in an example implementation in which an effect of gravity is reduced from an input and thresholds are leveraged to identify a gesture.

FIG. 5 depicts a procedure 500 in an example implementation in which an effect of gravity is reduced from an input and thresholds are leveraged to identify a gesture. An input is recognized as involving acceleration of a mobile communication device beyond a threshold for one or more of an x, y, or z axis (block 502). As before, an input may be recognized as acceleration by the acceleration module 112. In this instance, however, a threshold is employed to aid in identification of the gesture.

An effect of gravity is reduced from the input (block 504). Continuing with the previous example, the thresholds may be used to define an amount of acceleration, beyond which, is to be used to define the gesture. This may be performed in a variety of ways. For example, integration may be performed as described in relation to FIG. 2 to portions of the input 202 that are beyond the positive and negative thresholds 210, 212.

In another example, the input is described at least in part based on thresholds that were crossed for corresponding one or more of the x, y, or z axes (block 506). In this example, the crossing of the threshold itself is utilized to define the input and the corresponding gesture. Returning again to FIG. 2, the input 202 may be described as crossing the positive threshold 210 two times followed by crossing the negative threshold 212 twice which is then followed by crossing the positive threshold 210 twice. An amount of time between the crossing may also be noted by the acceleration module 112.

The described input may then compared to one or more definitions of gestures that are defined using the crossing of thresholds for x, y, or z, axes (block 508). Continuing with the previous example, an erase gesture may also be defined as crossing the positive threshold 210 two times followed by crossing the negative threshold 212 twice which is then followed by crossing the positive threshold 210 twice, an example of which is shown in the graph 200 of FIG. 2. Therefore, a particular gesture may be identified based on the comparison (block 510) of the crossing of the thresholds without integrating the inputs. In an implementation, however, the effect of gravity is first removed from the inputs (e.g., using integration) and then the thresholds and comparison are employed. A variety of other examples are also contemplated.

Example Device

Figure 6:
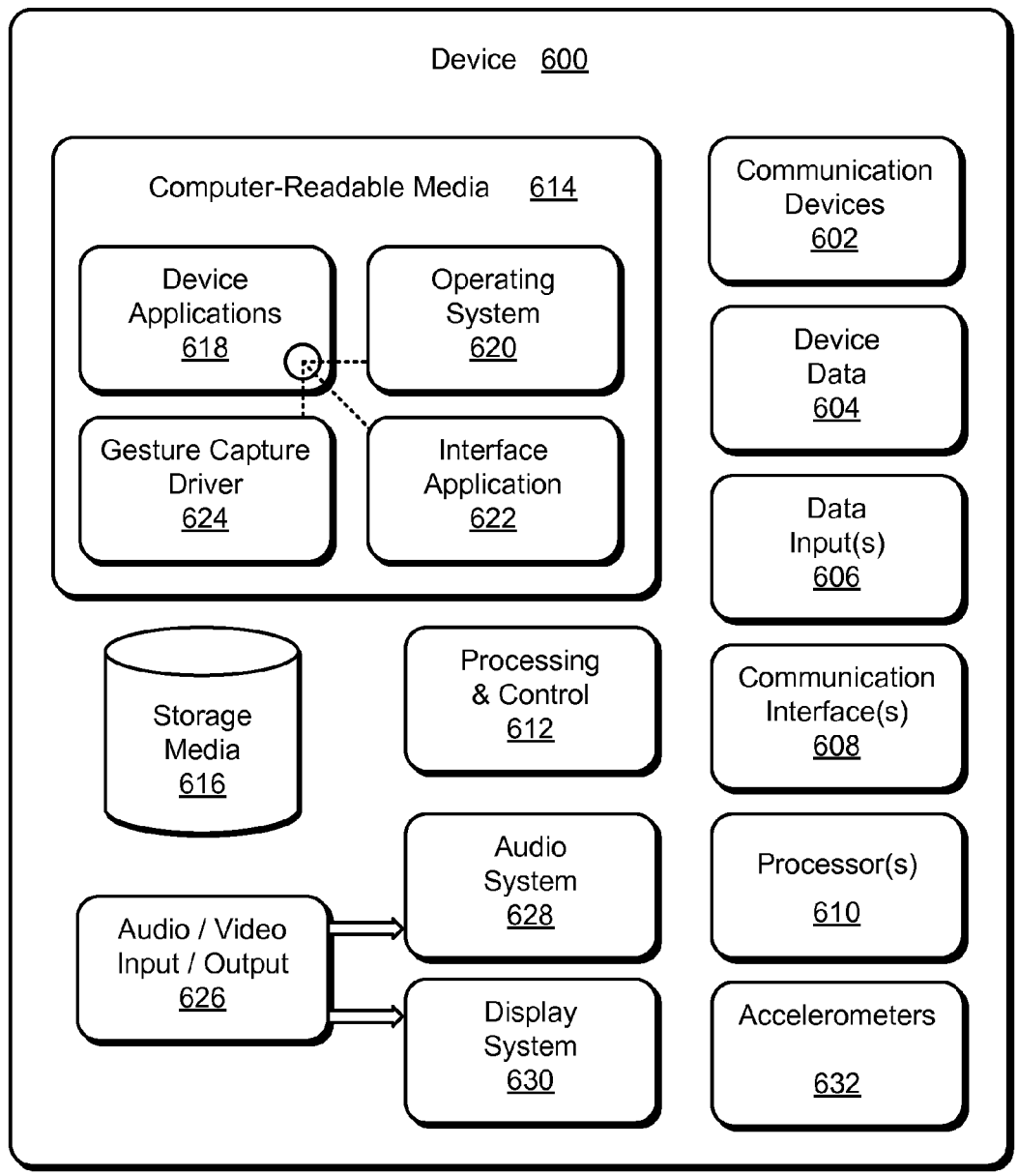
FIG. 6 illustrates various components of an example device that can be implemented as any type of portable and/or computer device as described with reference to FIGS. 1-5 to implement embodiments of the gesture techniques described herein.

FIG. 6 illustrates various components of an example device 600 that can be implemented as any type of portable and/or computer device as described with reference to FIG. 1 to implement embodiments of the gesture techniques described herein. Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface, such as to make or receive a telephone call over a telephone network. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments described herein. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.). The device applications 618 also include any system components or modules to implement embodiments of the gesture techniques described herein. In this example, the device applications 618 include an interface application 622 and a gesture-capture driver 624 that are shown as software modules and/or computer applications. The gesture-capture driver 624 is representative of software that is used to provide an interface with a device configured to capture a gesture, such as a touchscreen, track pad, camera, and so on. Alternatively or in addition, the interface application 622 and the gesture-capture driver 624 can be implemented as hardware, software, firmware, or any combination thereof. Additionally, the gesture-capture driver 624 may be configured to support multiple input devices, such as separate devices to capture touch and stylus inputs, respectively. For example, the device may be configured to include dual display devices, in which one of the display device is configured to capture touch inputs while the other stylus inputs.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

The device 600 also includes one or more accelerometers 632, although other sensors capable of sensing movement are also contemplated. A variety of different accelerometers may be employed, such as separate accelerometers 632 to measure pure acceleration is a respective one of an x, y, or z axis, an multi-axis accelerometer, and so on.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   recognizing an input received by a computing device as describing acceleration;
   reducing an effect of gravity from the input by the computing device; and
   identifying a gesture from the input that has the effect of gravity reduced by comparing an order of a plurality of crossings of positive and negative thresholds for one or more of the x, y, or z axis described by the input with a description of the gesture that specifies an order of a plurality of crossings of positive and negative thresholds for one or more of the x, y, or z axis, the gesture effective to cause an operation to be performed by the computing device.

2. A method as described in claim 1, wherein the input describes proper acceleration.

3. A method as described in claim 1, wherein the acceleration involves acceleration of the computing device through a plurality of axes.

4. A method as described in claim 1, further comprising detecting the input using a plurality of accelerometers.

5. A method as described in claim 4, wherein the detecting is performed for at least three axes.

6. A method as described in claim 1, wherein the reducing the effect of gravity from the input includes computing an effect of the gravity on the acceleration in a plurality of axes beyond a threshold.

7. A method as described in claim 1, wherein the reducing the effect of gravity from the input involves quaternion interpolation.

8. A method as described in claim 1, wherein the operation involves interaction with a user interface output by the computing device.

9. A method as described in claim 1, wherein the input describes acceleration of the computing device beyond a threshold for one or more of an x, y, or z axis.

10. A method as described in claim 1, wherein the identifying is performed without performing integration on the input that has the effect of gravity removed.

11. A method comprising:
    recognizing an input as involving acceleration of a mobile communication device beyond a threshold for one or more of an x, y, or z axis; and
    identifying a gesture from the input that has an effect of gravity reduced from one or more of the x, y, or z axis without performing integration on the input that has the effect of gravity reduced, the gesture being identified from a plurality of gestures that are defined using a respective order of a plurality of crossings of positive and negative thresholds for the x, y, or z axes, the gesture effective to cause an operation to be performed by the mobile communication device.

12. A method as described in claim 11, wherein the effect of gravity is reduced for the one or more of the x, y, or z axis using interpolation of an area of a curve described by the input that is beyond the threshold.

13. A method as described in claim 11, further comprising detecting the acceleration of the mobile communication device using one or more accelerometers of the mobile communication device.

14. A method as described in claim 11, wherein the operation involves interaction with a user interface output by the mobile communication device.

15. A method as described in claim 11, wherein the mobile communication device includes telephone functionality to make and receive telephone calls.

16. A method as described in claim 11, wherein the identifying of the gesture involves comparing a plurality of crossings of the threshold for one or more of the x, y, or z axis described by the input with a description of the gesture that specifies particular said crossing for particular said one or more of the x, y, or z axis.

17. A mobile communication device comprising:
- a housing;
- a display device disposed on the housing and configured to be viewable by a user;
- one or more accelerometers disposed within the housing and configured to detect acceleration through an x, y, and z axis; and
- one or more modules disposed within the housing an communicatively coupled to the accelerometers and the display device, the one or more modules configured to recognize an input detected using the one or more accelerometers as describing acceleration of the mobile communication device through the x, y, or z axis, reduce an effect of gravity from the input using interpolation and corresponding threshold for each of the x, y, or z axis, and identify a gesture from the input having the effect of gravity reduced by comparing an order of a plurality of crossings of positive and negative thresholds for one or more of the x, y, or z axis described by the input with a description of the gesture that specifies an order of a plurality of crossings of positive and negative thresholds for one or more of the x, y, or z axis.

18. A mobile communication device as described in claim 17, wherein the one or more modules are configured to reduce the effect of gravity by computing for each curve of the input describing acceleration of the mobile communication device through a respective said x, y, or z axis:
- an area beyond a respective said threshold for the curve;
- a time at a start of the curve;
- a time at an end of the curve,
- a time of a peak of the curve; and
- an amplitude of the curve.

19. A mobile communication device as described in claim 17, wherein the effect of gravity is reduced from the input using quaternion interpolation of at least two samples taken from the input.

20. A mobile communication device as described in claim 17, wherein the one or more modules include telephone functionality sufficient to wirelessly communicate via a telephone network.

\* \* \* \* \*